G. G. Howard.
Stamping Mach.
No. 3,741. Reissued Nov. 23, 1869.
Fig. 1.
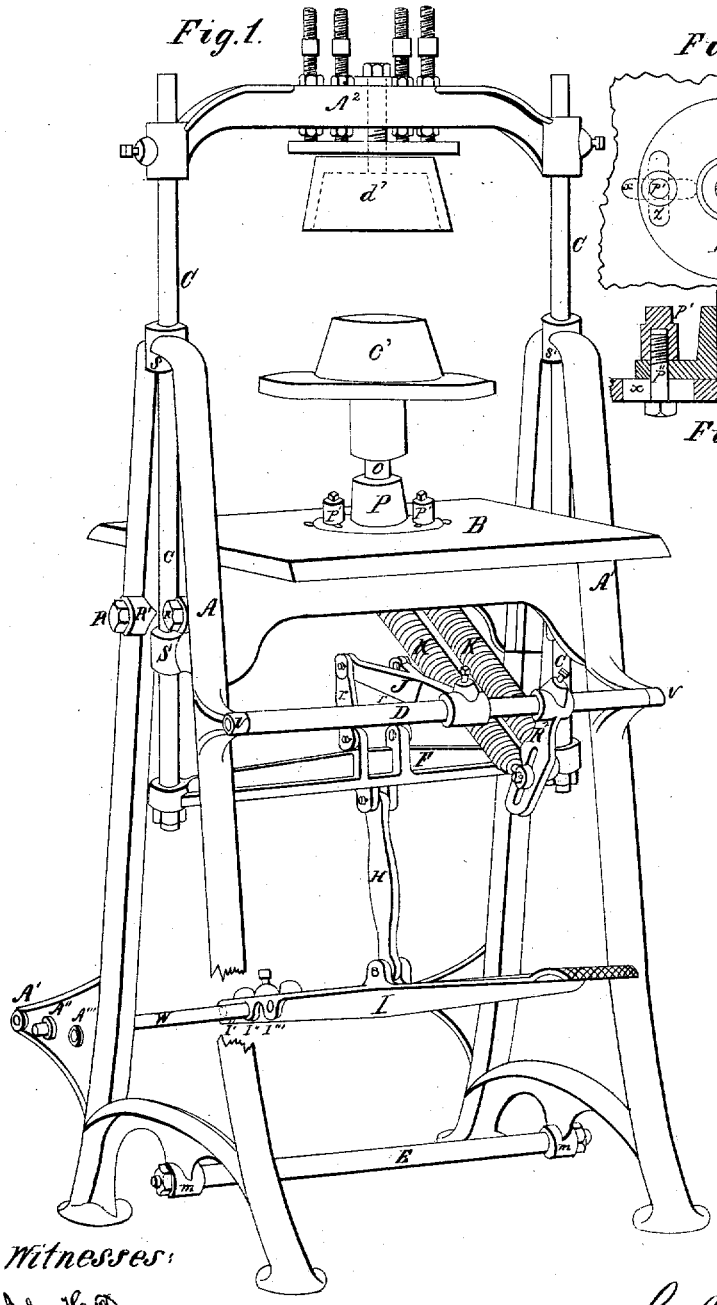
Fig. 2.
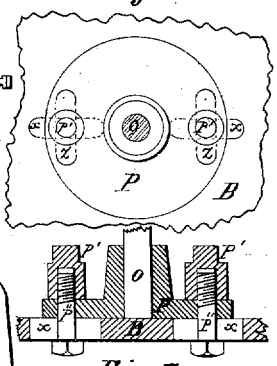
Fig. 3.
Witnesses:
John H. Dale
H. Lippincott
Inventor:
Geo. G. Howard
N. PETERS, PHOTO-LITHOGRAPHER, WASHINGTON, D. C.

UNITED STATES PATENT OFFICE.

GEORGE C. HOWARD, OF PHILADELPHIA, PENNSYLVANIA.

IMPROVED MACHINE FOR PRESSING AND MOLDING PLIABLE MATERIALS.

Specification forming part of Letters Patent No. 55,658, dated June 19, 1866; Reissue No. 3,741, dated November 23, 1869.

*To all whom it may concern:*

Be it known that I, GEO. C. HOWARD, of Philadelphia, in the county of Philadelphia and State of Pennsylvania, have invented certain new and useful Improvements in Machines for Pressing and Molding Pliable Materials; and I do hereby declare that the following is a full, clear, and exact description of the construction and operation of the same, reference being had to the annexed drawings, making part of this specification, in which—

Figure 1 is a perspective view, Fig. 2 a plan showing the method of adjusting the mold-stand, and Fig. 3 a vertical section of the latter.

The objects of this invention are, first, to save labor and material in the construction of the machine; second, to provide an efficient and simple means of adjustment for the lower molds; and, thirdly, to make the leverage of the treadle I variable or adjustable without altering its relative position in regard to the other parts of the machine through which it performs its functions. The first object is gained by constructing several parts of the machine in one piece in such a manner that this one piece can be made in less time and with less material than the several pieces could have been constructed in and fitted to their proper places, while at the same time the efficiency of the several parts in the performance of their proper relative functions is enhanced by reason of the greater rigidity of the whole.

The frame of the machine, as represented in the accompanying drawings, is composed of the two housings A A′, the table B, and the bolt E, which rigidly connects the feet of the housings. This frame sustains and guides the pressure-frame, consisting of the yoke $A^2$, the cross-head F, and the pressure-rods C C. The frame also sustains the treadle I and the treadle-shaft W, to which the treadle is secured, as well as the rock-shaft P, through which the springs K K, for raising the pressure-frame, are connected with said frame. Each housing A is constructed in one piece with guide bearings or bosses S S, through which the pressure-rod C at the same side of the machine is passed. Each housing is also constructed in one piece with the bosses A′ A″ A‴, that support the treadle-shaft, and with the boss V, which forms the bearing of the rock-shaft D; hence the expense of constructing each boss or bearing separately and securing it to the housing is saved, while the risk of the loosening of the connecting-bolts, required in case of a separate construction of the bosses, by the jar of the machine is prevented. Moreover, the bolts R, which pass through the bosses R′ of the housings and combine the latter with the table, also secure the various bosses or bearings of the frame to the table. Expense is also saved by constructing the table B in such a manner that it shall have a large bearing-surface on the housing A A in a vertical direction, thereby making it answer for a brace, by which the parallelism of the rods C C is better preserved. The bolts R R, passing through bosses R′ R′, connect and fasten the table B to the housings A and A′. By reference to Fig. 1 it will be seen that the upper and lower bosses, S S, cast on the housings A and A′, form the guides and supports for the sliding pressure-rods C C, and as these rods are straight, it follows that the two bosses of each housing must be in line with each other—that is to say, their position to each other must be such that only one center or axial line can be drawn through them. The position of the bosses V V permits their being used as bearings for the rock-shaft D, and the bosses *m m* are properly placed for supporting the brace-rod E. The fulcrum-bosses A′ A″ A‴ are placed so that by shifting the fulcrum-shaft W from one to the other the leverage of the treadle I is altered, but its position remains the same, provided, however, that the fulcrum-shaft W is always put through the corresponding hole in the treadle. A line drawn through the centers of all the bosses A′ A″ A‴ should run at or nearly at right angles to the direction of the motion which the treadle imparts. The treadle I is provided with fulcrum-bosses I′ I″ I‴, the distance between whose centers is the same as that between the centers of A′ A″ A‴, so that W may pass through A′ and I′, A″ and I″, or A‴ and I‴ without changing the position of the treadle I. The number of these bosses on A A and I may be two or more, according to the requirements of the machine.

It is necessary that the stand P, to which the lower molds are fastened, should be adjustable in every horizontal direction. If the bolts $p''$, Figs. 2 and 3, were passed through holes of the same size as the bolts merely, no such adjustment would be possible; and if the stand P alone, or the table B alone, were provided with elongated holes or slots running parallel with each other, the adjustment could be made only in the direction of the length of the slots; and if both P and B were provided with parallel slots, no adjustment at an angle with the slots could be made; but by providing the stand P with slots L L, which run at an angle with those $x$ $x$ in the table B, the stand P can be adjusted in all horizontal directions. It is not absolutely necessary that the slots $x$ $x$ should form a right angle with the slots L L, but the nearer they approach that position the more effective is the arrangement.

The operation of the machine is as follows: When the upper mold, $d$, on the yoke $A^2$, and the lower mold, C′, on the stand P, have been properly centered, the material is introduced between them. By compressing the treadle the upper mold closes upon the lower, the motion being communicated from the treadle by means of the link H, cross-head F, and parallel rods C C. When the pressure upon the treadle I is relaxed, the springs K K, being connected with the cross-head by means of the arm $R^2$, rock-shaft D, arm J, and links $r$ $r$, elevate the pressure-frame and treadle, thereby bringing the mold to its former position.

I am aware that in various machines the principal bearings have been cast in one piece with the frame or housing, and also that the idea of making parts of machinery adjustable in all directions in a certain plane by means of slots is old, and therefore do not claim either of the above inventions abstractly; nor do I claim the combination of a treadle and housing when each is provided with only one fulcrum-boss; nor do I claim the particular construction of the table B, apart from machines for pressing and molding pliable materials; but What I do claim is—

1. Constructing the frame of the machine of the two housings A A′, each in one piece, the bolt E, and the table B, or its equivalent, interposed between and secured to said housings, substantially as set forth.

2. In the construction of said housings, casting in one piece with them, respectively, and at the points thereon described and shown, the bosses for the pressure-rods and for the treadle-shaft, all as set forth.

3. In the construction of said housings, casting in one piece with them, respectively, and at the points thereon described and shown, the bosses R′, V, and $m$, as and for the purposes set forth.

4. The combination of the stand for the lower mold and the table of the press-frame by means of cross-slots and bolts, as before set forth, so as to permit of the horizontal adjustment of the stand upon the table in every direction.

5. In the construction of said housings, casting in one piece with them, respectively, and at the points thereon described and shown, all the bosses severally described herein—that is to say, for the pressure-rods, for the rods which confine the table, for the rod E, for the rock-shaft O, and for the treadle-shaft W—in the manner and for the purposes set forth.

6. In combination with the frame of the press, the shaft W, treadle I, two or more bosses, I′ I′, on said treadle I, and two or more bosses, A′ A″, on said frame, all of said bosses being provided with holes for the reception of said shaft W, as set forth.

GEO. C. HOWARD.

Witnesses:

JOHN H. DALE,
H. LIPPINCOTT.